(12) United States Patent
Magner et al.

(10) Patent No.: US 6,938,593 B2
(45) Date of Patent: *Sep. 6, 2005

(54) COMPUTER READABLE STORAGE MEDIUM FOR USE WITH ENGINE HAVING VARIABLE VALVE ACTUATOR

(75) Inventors: Steve W. Magner, Farmington Hills, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/714,167

(22) Filed: Nov. 13, 2003

(65) Prior Publication Data

US 2005/0103290 A1    May 19, 2005

(51) Int. Cl.[7] ................................................ F01L 1/34
(52) U.S. Cl. ................................. 123/90.16; 123/90.15; 123/90.17
(58) Field of Search ...................... 123/90.15, 90.16, 123/90.17, 90.18, 198 D

(56) References Cited

U.S. PATENT DOCUMENTS

| | | | |
|---|---|---|---|
| 5,596,956 A | 1/1997 | Ogawa et al. | |
| 6,202,609 B1 | 3/2001 | Metz | |
| 6,230,675 B1 | 5/2001 | Kobayashi et al. | |
| 6,276,334 B1 * | 8/2001 | Flynn et al. | 123/435 |
| 6,401,675 B1 | 6/2002 | Nakamura et al. | |
| 6,575,128 B2 * | 6/2003 | Nakamura et al. | 123/90.16 |
| 6,595,187 B1 | 7/2003 | Russell | |
| 6,615,775 B2 * | 9/2003 | Takemura et al. | 123/90.15 |
| 6,732,682 B2 * | 5/2004 | Aoyama et al. | 123/48 B |
| 6,739,296 B2 * | 5/2004 | Machida | 123/90.16 |
| 2003/0093214 A1 | 5/2003 | Jankovic et al. | |
| 2003/0192495 A1 | 10/2003 | Hagner et al. | |

FOREIGN PATENT DOCUMENTS

JP    2001263099 A  *  9/2001    ........... F02D 13/02

* cited by examiner

*Primary Examiner*—Thomas Denion
*Assistant Examiner*—Ching Chang
(74) *Attorney, Agent, or Firm*—Allan J. Lippa; Alleman Hall McCoy Russell & Tuttle LLP

(57) ABSTRACT

Piston to valve interference in an internal combustion engine is detected and alleviated by adjusting valve timing, valve lift, and/or compression ratio. Specifically, based on actuator motion, an actuator is selected to reduce potential interference. Further, potential sensor and hardware degradation are considered in controlling actuators to reduce potential interference.

22 Claims, 10 Drawing Sheets

COMPUTER READABLE STORAGE MEDIUM FOR USE WITH ENGINE HAVING VARIABLE VALVE ACTUATOR

CROSS REFERENCE

The present application incorporates by reference, for all purposes, the entire contents of U.S. Ser. No. 10/714,682, titled "COMPUTER READABLE STORAGE MEDIUM FOR USE WITH ENGINE HAVING VARIABLE VALVE ACTUATOR DURING DEGRADATION", filed Nov. 13, 2003.

TECHNICAL FIELD

The field of the invention relates to engines having variable valve actuators, and in particular to methods for controlling transient behavior of said actuators.

BACKGROUND OF THE INVENTION

During internal combustion piston engine operation, the piston moves between a bottom dead center (BDC) and a top dead center (TDC) position. When operating near the TDC position, depending on various parameters, there may be physical interference between the engine's valves and the piston.

U.S. Pat. No. 6,230,675 describes one situation where such interference can occur. In this example, variation in valve opening timing is combined with a low and high lift cam. Here, the potential interference is addressed by limiting the advancing of the valve opening timing only when a large valve lift is selected. Further, the limiting occurs only when valve control unit is activated and the system is in a high speed mode.

The inventors herein have recognized a disadvantage with such an approach. In particular, the system always limits the advancing of the cam. However, there may be conditions where advancing the cam without limitation, but limiting valve lift, may provide improved performance or increased fuel economy. In addition, whether the valve timing or whether the valve lift should be limited can depend on various factors, such as which actuator has a faster or slower response rate/delay. Furthermore, additional actuators can also influence the potential interference, such as variable compression ratio.

The inventors herein have also recognized that the approach of '675 involves situations where there is an actuator failure. However, potential interference can occur even when both actuators are functional, yet one is moving faster or slower than another during transient conditions.

SUMMARY OF THE INVENTION

In one example, the above disadvantage of prior approaches is overcome by a method for controlling valve operation of valves coupled to a cylinder of an internal combustion engine with a piston. The method comprises:
  indicating potential interference between the piston and the valve;
  selecting at least one of valve timing and valve lift based on a direction of valve timing change and valve lift change; and
  in response to said indication, limiting said selected one of valve timing and valve lift to reduce said potential for interference.

By selecting whether to limit at least one of valve timing and valve lift based on a direction of change, it is possible to take the most efficient approach to reducing any piston-valve interference. In other words, if valve timing is already moving in a direction to reduce interference, the system can take advantage of that already started motion to more quickly reduce interference. Likewise, if valve lift is already moving in a direction to reduce interference, the system can take advantage of that already started motion to more quickly reduce interference.

An advantage of the above aspect is that it is possible to more quickly reduce potential for piston-valve interference. Another advantage is that it is possible to select the most appropriate actuator to reduce potential interference depending on engine or vehicle operating conditions.

Note that there are various ways to indicate potential interference between the piston and the valve. This can be based on look-up tables employing engine sensor information. Alternatively, it can be based on an algorithm that takes current conditions (measured or estimated) to determine valve clearance values. Note also that there are various ways to determine direction of valve timing or valve lift changes. For example, this can be based on sensor data filtered with a high pass filter, or it can be based on differential measurements. Finally, note that there are various ways to limit the selected valve timing or valve lift to reduce potential for interference. For example, the commanded value for the selected actuator can be clipped to a certain value. Alternatively, the electrical signal sent to the actuator can be limited to a certain voltage, or duty cycle. Still further, the control algorithm can be altered (or a different algorithm selected) so that the actuator signals are calculated to be with a limited range.

BRIEF DESCRIPTION OF THE DRAWINGS

The advantages described herein will be more fully understood by reading example embodiments in which the invention is used to advantage, referred to herein as the Description of Embodiment(s), in which like reference numbers indicate like features, with reference to the drawings wherein.

DESCRIPTION OF EMBODIMENT(S)

Figure 1A:
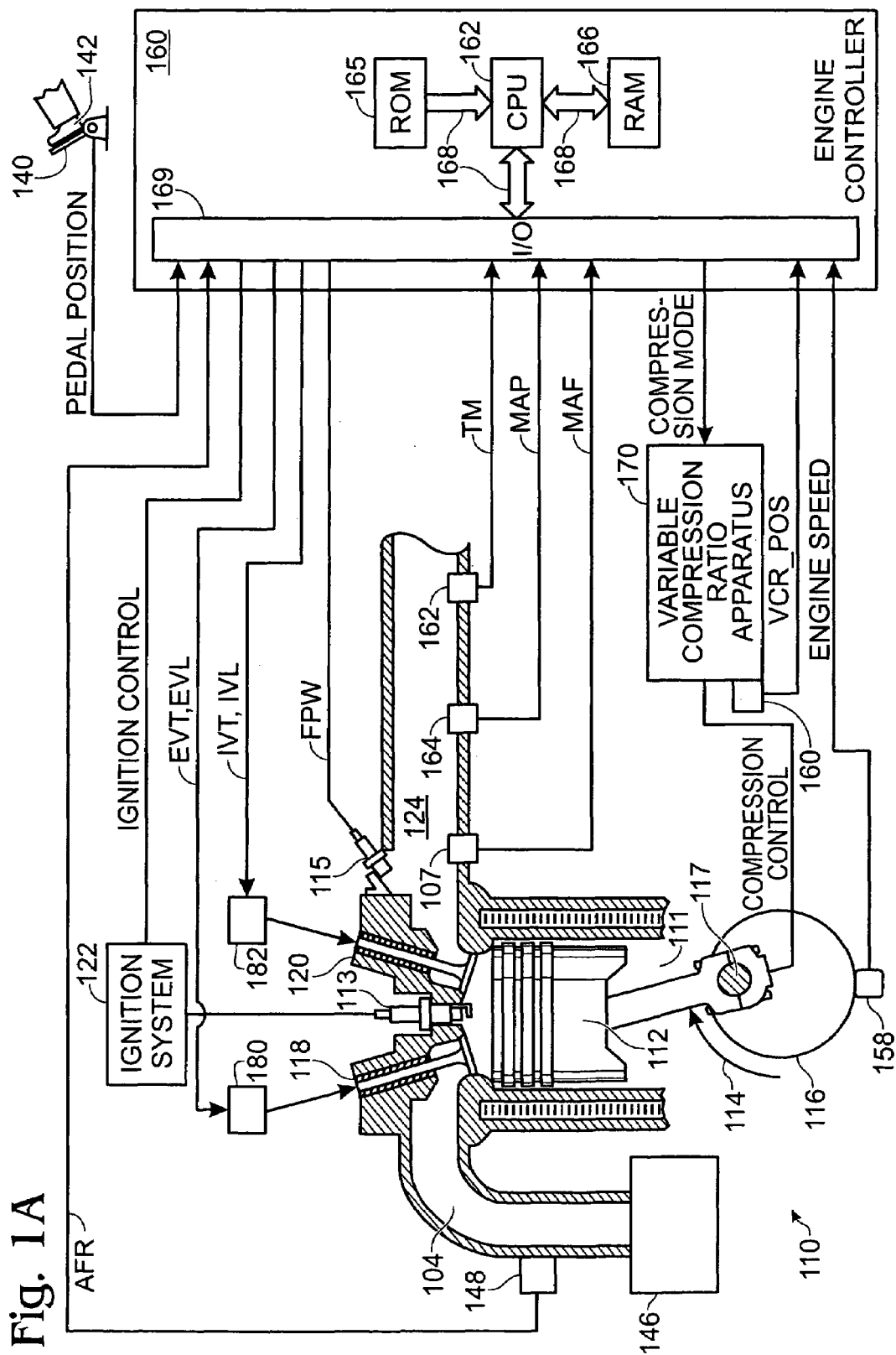
FIGS. 1A and 1B are a block diagrams of an engine in which the invention is used to advantage.

FIG. 1A shows a diagram of a system for operating a variable compression ratio internal combustion engine in accordance with an example embodiment of the present invention. The engine 110 shown in FIG. 1A, by way of example and not limitation, is a gasoline four-stroke direct fuel injection (DFI) internal combustion engine having a plurality of cylinders (only one shown), each of the cylinders having a combustion chamber 111 and corresponding fuel injector 113, spark plug 115, intake manifold 124, exhaust manifold 104, and reciprocating piston 112. The engine 110, however, can be any internal combustion engine, such as a port fuel injection (PFI) or diesel engine, having one or more reciprocating pistons as shown in FIG. 1A. Each piston of the internal combustion engine is coupled to a fixed-length connecting rod 114 on one end, and to a crankpin 117 of a crankshaft 116. Also, position sensor 160 is coupled to compression ratio mechanism 170 for measuring compression ratio position.

Exhaust manifold 104 is coupled to an emission control device 146 and exhaust gas sensor 148. Emission control device 146 can be any type of three-way catalyst, such as a NOx adsorbent having various amounts of materials, such as precious metals (platinum, palladium, and rhodium) and/or barium and lanthanum. Exhaust gas sensor 148 can be a linear, or full range, air-fuel ratio sensor, such as a UEGO (Universal Exhaust Gas Oxygen Sensor), that produces a substantially linear output voltage versus oxygen concentration, or air-fuel ratio. Alternatively, it can be a switching type sensor, or HEGO (Heated Exhaust Gas Oxygen Sensor).

The reciprocating piston 112 is further coupled to a compression ratio mechanism 170 that is operated by an electronic engine controller 160 to vary the compression ratio of the engine. "Compression ratio" includes the ratio of the volume in the cylinder 111 above the piston 112 when the piston is at bottom-dead-center (BDC) to the volume in the cylinder above the piston 112 when the piston 112 is at top-dead-center (TDC). The compression ratio mechanism 170 is operated to effect a change in the engine's compression ratio in accordance with one or more parameters, such as engine load and speed, for example. Such parameters are measured by appropriate sensors, such as a speed (RPM) sensor 158, mass air flow (MAF) sensor 102, pedal position sensor 140, compression ratio sensor 160, manifold temperature sensor 162, and manifold pressure sensor (164), which are electronically coupled to the engine controller 160. The compression ratio mechanism 170 can be one such as described in U.S. Pat. No. 6,595,187, for example. However, other types of compression ratio adjusting mechanisms can be used, such as one which provides a variable sized volume outside of the cylinder to vary compression ratio. Likewise, the mechanism for adjusting compression ratio can be hydraulic, electrical, electro-hydraulic, electro-mechanical, electromagnetic, or various others.

Referring again to FIG. 1A, the engine controller 160 includes a central processing unit (CPU) 162 having corresponding input/output ports 169, read-only memory (ROM) 165 or any suitable electronic storage medium containing processor-executable instructions and calibration values, random-access memory (RAM) 166, and a data bus 168 of any suitable configuration. The controller 160 receives signals from a variety of sensors coupled to the engine 110 and/or the vehicle, and controls the operation of the fuel injector 115, which is positioned to inject fuel into a corresponding cylinder 111 in precise quantities as determined by the controller 160. The controller 160 similarly controls the operation of the spark plugs 113.

In addition, engine 110 also has variable valve actuators 180 and 182 for actuating intake valve 120 and exhaust valve 118, respectively. Controller 160 controls actuators 180 and 182 via signals EVL, EVT, IVL, IVT, representing exhaust valve lift, exhaust valve timing, intake valve lift, and intake valve timing, respectively. The actuators can independently adjust valve lift and valve timing of the valves. In one example, these can be electro-hydraulic actuators that allow cam-less engine operation. Alternatively, they can be electromagnetic actuators. In still another embodiment, separate electro-hydraulic actuators can be used to adjust cam timing and valve lift of the valves. Note that not all of the valves can have variable timing or lift. For example, one valve can have variable valve lift and the other can have variable valve timing.

Note also that FIG. 1A illustrates a two valve engine, which can be operated either via the electronic valves as indicated, or via an overhead cam. Alternatively, a four valve per cylinder system can be used, with two intake and two exhaust valves (each of the same or different size). Further still, a three-valve per cylinder system can be used where two intake valves, and one exhaust valve are used.

Note that, in an alternative embodiment, engine 110 does not have various parts indicated in FIG. 1A. For example, the engine may not have the variable compression ratio mechanism and corresponding sensors and actuators.

Figure 1B:
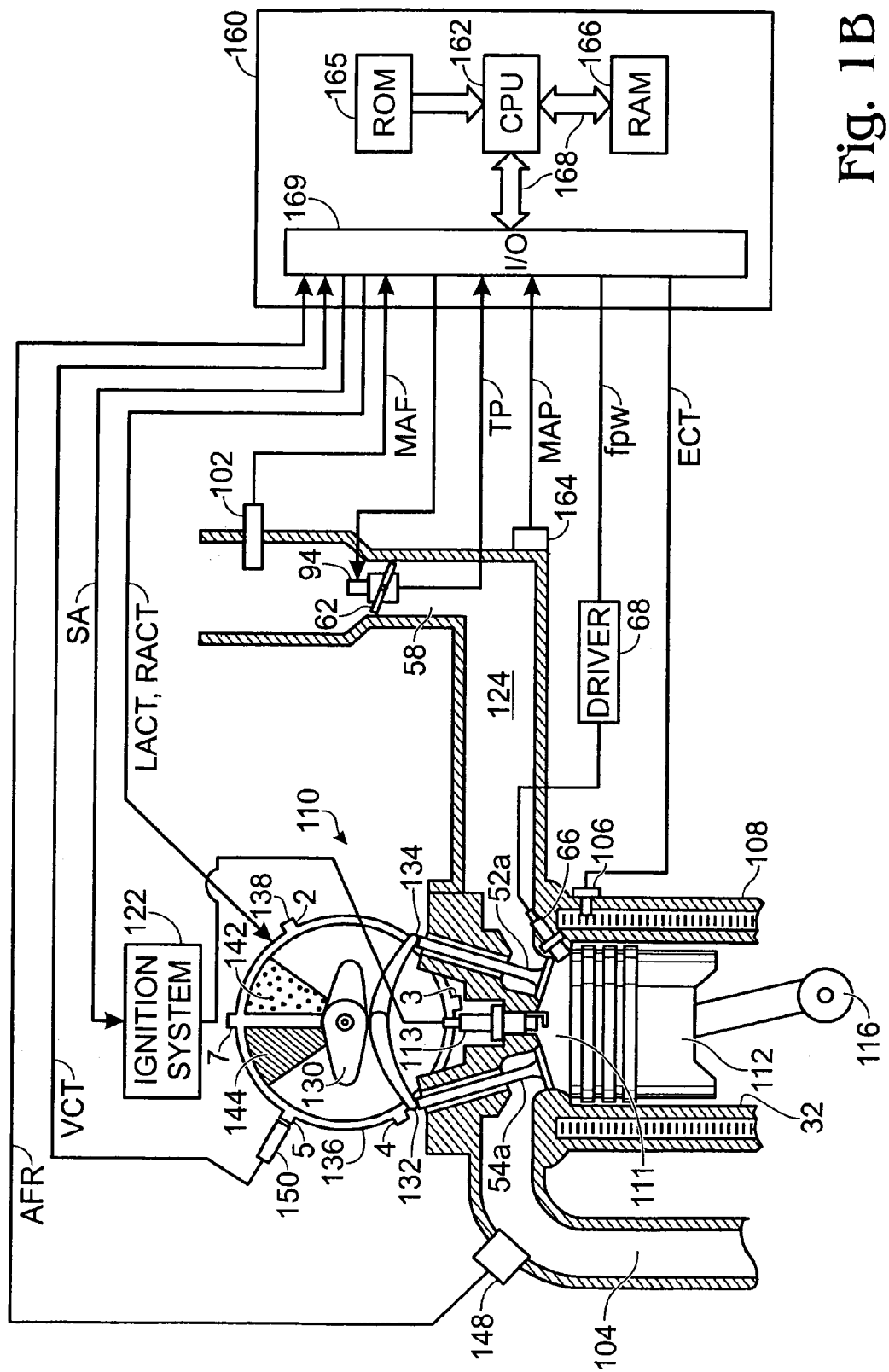

FIG. 1B shows engine 110 having a variable cam timing actuator. In this example, engine 110 is shows to be a direct injection spark ignited internal combustion engine, rather than the port fuel injection system illustrated in FIG. 1A, since either type of fuel injection can be used. Here, combustion chamber 111 of engine 110 is shown in FIG. 1B including combustion chamber walls 32 with piston 112 positioned therein. In this particular example piston 112 includes a recess or bowl (not shown) to help in forming stratified charges of air and fuel. Combustion chamber, or cylinder, 111 is shown communicating with intake manifold 124 and exhaust manifold 104 via respective intake valves 52a and 52b (not shown), and exhaust valves 54a and 54b (not shown). Fuel injector 66 is shown directly coupled to combustion chamber 111 for delivering liquid fuel directly therein in proportion to the pulse width of signal fpw received from controller 12 via conventional electronic driver 68. Fuel is delivered to fuel injector 66 by a high pressure fuel system (not shown) including a fuel tank, fuel pumps, and a fuel rail. Note that the variable compression ratio system can also be included, but is not shown.

Intake manifold 124 is shown communicating with throttle body 58 via throttle plate 62. In this particular example, throttle plate 62 is coupled to electric motor 94 so that the position of throttle plate 62 is controlled by controller 160 via electric motor 94. Signal TP from throttle position sensor 70 is used to measure throttle position for the feedback control. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Controller 160 causes combustion chamber 111 to operate in either a homogeneous air/fuel mode or a stratified air/fuel mode by controlling injection timing. In the stratified mode, controller 160 activates fuel injector 66 during the engine compression stroke so that fuel is sprayed directly into the bowl of piston 112. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 160 activates fuel injector 66 during the intake stroke so that a substantially homogeneous air/fuel mixture is formed when ignition power is supplied to spark plug 113 by ignition system 122. Controller 160 controls the amount of fuel delivered by fuel injector 66 so that the homogeneous air/fuel mixture in chamber 111 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 111. An additional split mode of operation wherein additional fuel is injected during the exhaust stroke while operating in the stratified mode is also possible.

As indicated in FIG. 1A, controller 160 is a microcomputer including: microprocessor unit 162, input/output ports 169, an electronic storage medium for executable programs and calibration values shown as read only memory chip 165 in this particular example, random access memory 166, and a data bus 168. Note that keep alive memory (KAM) can also be added if desired. Controller 160 is shown receiving various signals from sensors coupled to engine 110, in addition to those signals previously discussed, including: measurement of inducted mass air flow (MAF) from mass air flow sensor 102 coupled to throttle body 58; engine coolant temperature (ECT) from temperature sensor 106 coupled to cooling sleeve 108; throttle position TP from throttle position sensor 70; and absolute Manifold Pressure Signal MAP from sensor 164. Engine speed signal RPM is generated by controller 12 from a profile ignition pick-up (PIP) signal coupled to the crankshaft in a conventional manner and manifold pressure signal MAP provides an indication of engine load. In a preferred aspect of the present invention, the PIP sensor, which is also used as an engine speed sensor, produces a predetermined number of equally spaced pulses every revolution of the crankshaft.

Continuing with FIG. 1B, camshaft 130 of engine 110 is shown communicating with rocker arms 132 and 134 for actuating intake valves 52a, 52b and exhaust valve 54a, 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 116. However, by manipulation of the hydraulic coupling as will be described later herein, the relative position of camshaft 130 to crankshaft 116 can be varied by hydraulic pressures in advance chamber 142 and retard chamber 144. By allowing high pressure hydraulic fluid to enter advance chamber 142, the relative relationship between camshaft 130 and crankshaft 116 is advanced. Thus, intake valves 52a, 52b and exhaust valves 54a, 54b open and close at a time earlier than normal relative to crankshaft 116. Similarly, by allowing high pressure hydraulic fluid to enter retard chamber 144, the relative relationship between camshaft 130 and crankshaft 116 is retarded. Thus, intake valves 52a, 52b and exhaust valves 54a, 54b open and close at a time later than normal relative to crankshaft 116.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another), while tooth 5 is preferably used for cylinder identification, as described later herein. In addition, Controller 12 sends control signals (LACT,RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five toothed wheel, a measure of cam timing for a particular bank is received four times per revolution, with the extra signal used for cylinder identification.

Note that FIG. 1B shows a 4 valve per cylinder engine, where cam timing of the intake and exhaust valves is adjusted via a single dual overhead cam. However, a single overhead cam can adjust only intake valve timing, or only exhaust valve timing. Alternatively, a dual overhead cam can be used, each with variable timing to separately adjust intake and exhaust valve timing. In addition, an electro-hydraulically actuated variable valve lift actuator can be added to the system of FIG. 1B to provide variable valve lift control.

As described above, during engine operation where valve timing, lift, and/or compression ratio are varied, there may be a potential for interference. In other words, to optimize fuel economy, it may be desirable to have a high compression ratio to increase indicated efficiency, a variable valve lift (or camless) valvetrain to reduce pumping losses, and a variable cam timing (VCT) for optimizing intake valve opening time. In this case, the engine design may allow a possibility of valve to piston collision under the most unfavorable positioning of the valve lift and cam timing. A variable compression ratio (VCR), if the engine is so equipped, additionally increases the risk of a collision when in high compression mode. In such an engine a minimum clearance between the valve and piston should be maintained by the engine control system by appropriately controlling the valve lift, cam timing, and compression ratio as described below. Various operating modes exist that the engine control should take into account.

Figure 2:
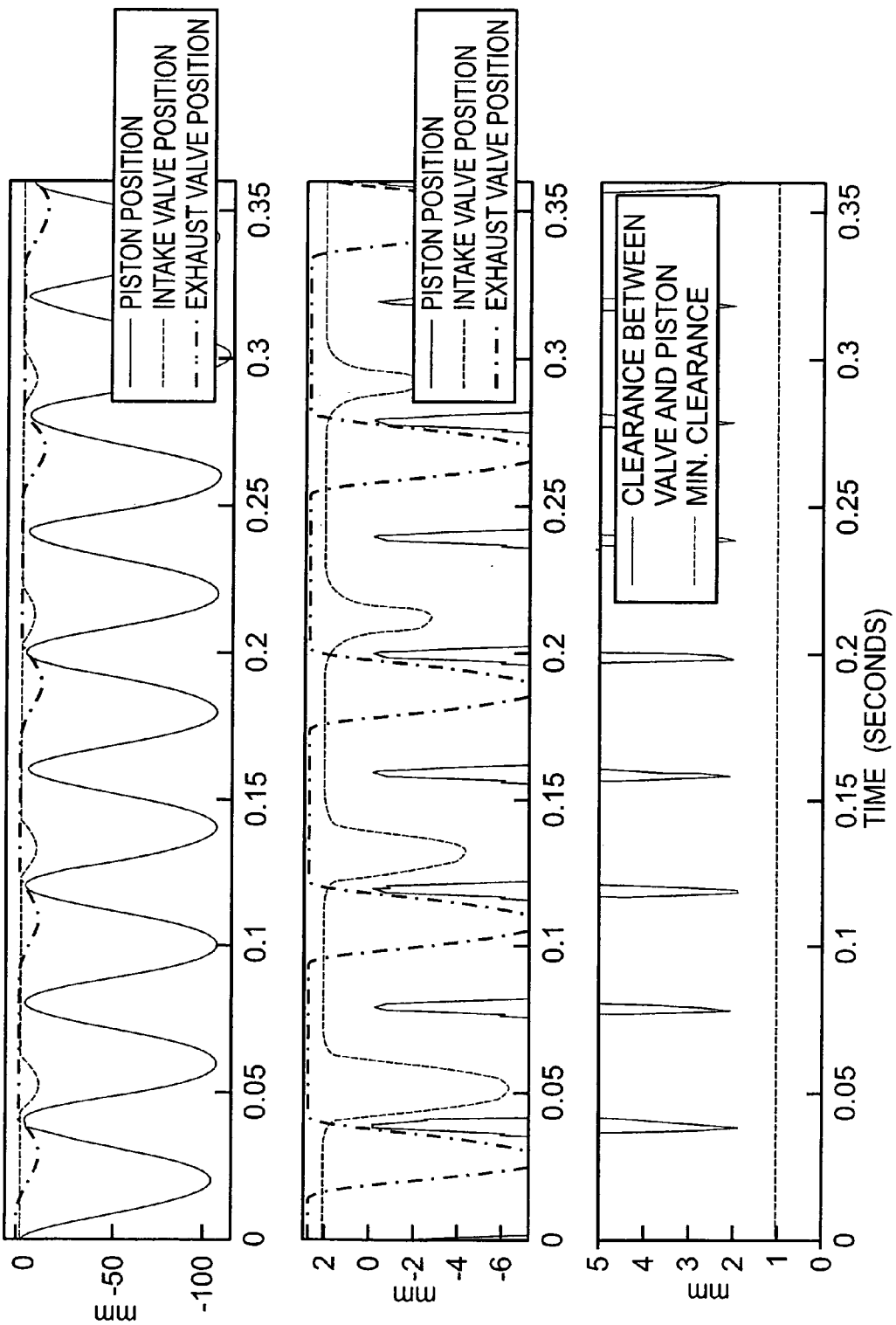
FIGS. 2–5 and 7–9 are graphs illustrating experimental and control data.

In the example of a center biased continuously variable valve lift (CVVL) mechanism (lift profiles that center about a fixed cam timing) requires intake cam-timing adjustment in order to maintain intake valve opening (IVO) near piston top dead center (TDC). FIG. 2 is an example if the VCT (variable cam timing) actuator does not adjust to maintain IVO. An intake cam advance that maintains IVO near TDC at low lift may result in a valve to piston collision if the lift increases suddenly. As such, FIG. 2 shows how clearance can change as the valves and piston translate through the engine cycle.

Figure 3:
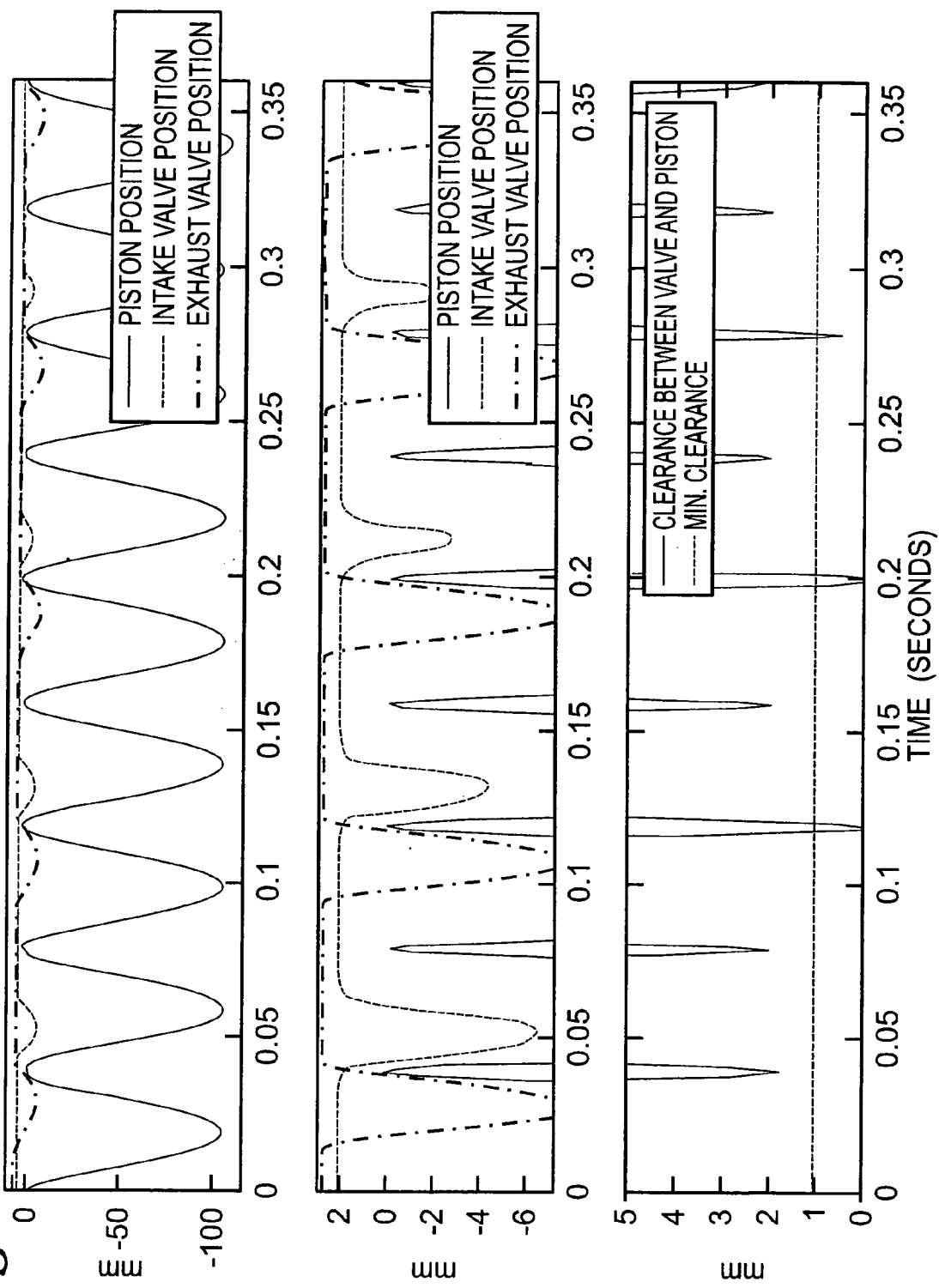

Several scenarios exist where different relative actuator speeds may result in minimum clearance violation (MCV) during transition:

A. MCV occurs because VCT travels faster than CVVL: Lift is commanded from high to low and intake timing must advance to maintain desired IVO. MCV results if VCT advance gets ahead of reduction in lift, allowing the valve to be too far extended when the piston is near TDC. In this case the proposed system should slow down the cam advance when the combination is determined to approach the MCV zone. FIG. 3 shows the uncoordinated results of this scenario. Specifically, FIG. 3 shows how a variation in valve timing and valve lift, even where the beginning and end positions both have sufficient clearance, can result in transient conditions of insufficient clearance (or clearance less than desired).

Figure 4:
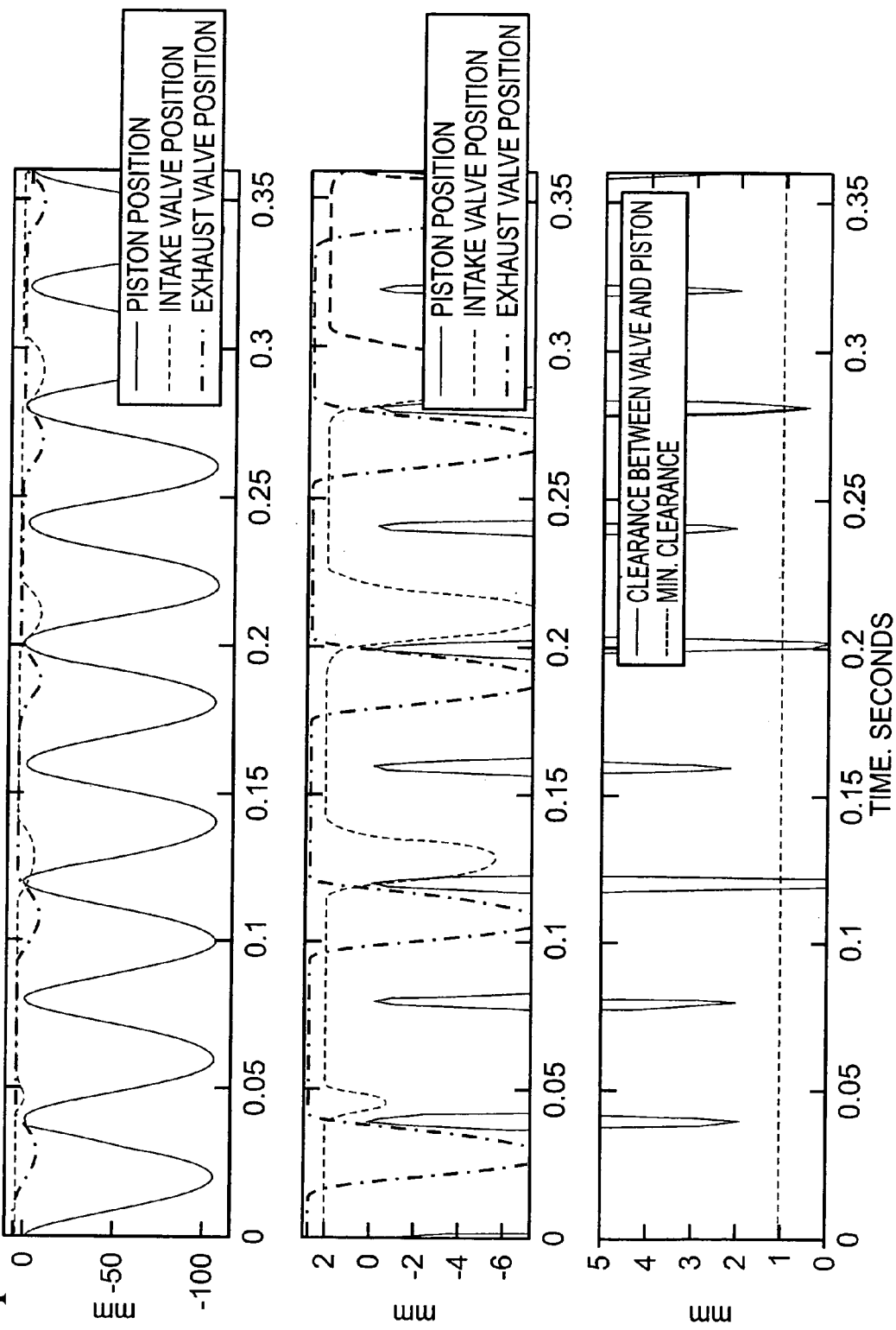

B. MCV occurs because CVVL is faster than VCT: Lift is commanded from low to high and intake timing must retard to maintain desired IVO resulting in a violation if lift increase gets ahead of VCT retard, allowing the valve to be too far extended when the piston is near TDC. We slow down the valve lift when the combination is determined to approach the MCV zone. FIG. 4 shows the un-coordinated results of this scenario. Specifically, FIG. 4 shows another example where, even though the two set-points (before and after) have sufficient clearance, due to variation in actuator speeds, there can be insufficient clearance during the transition between the two set-points.

Figure 5:
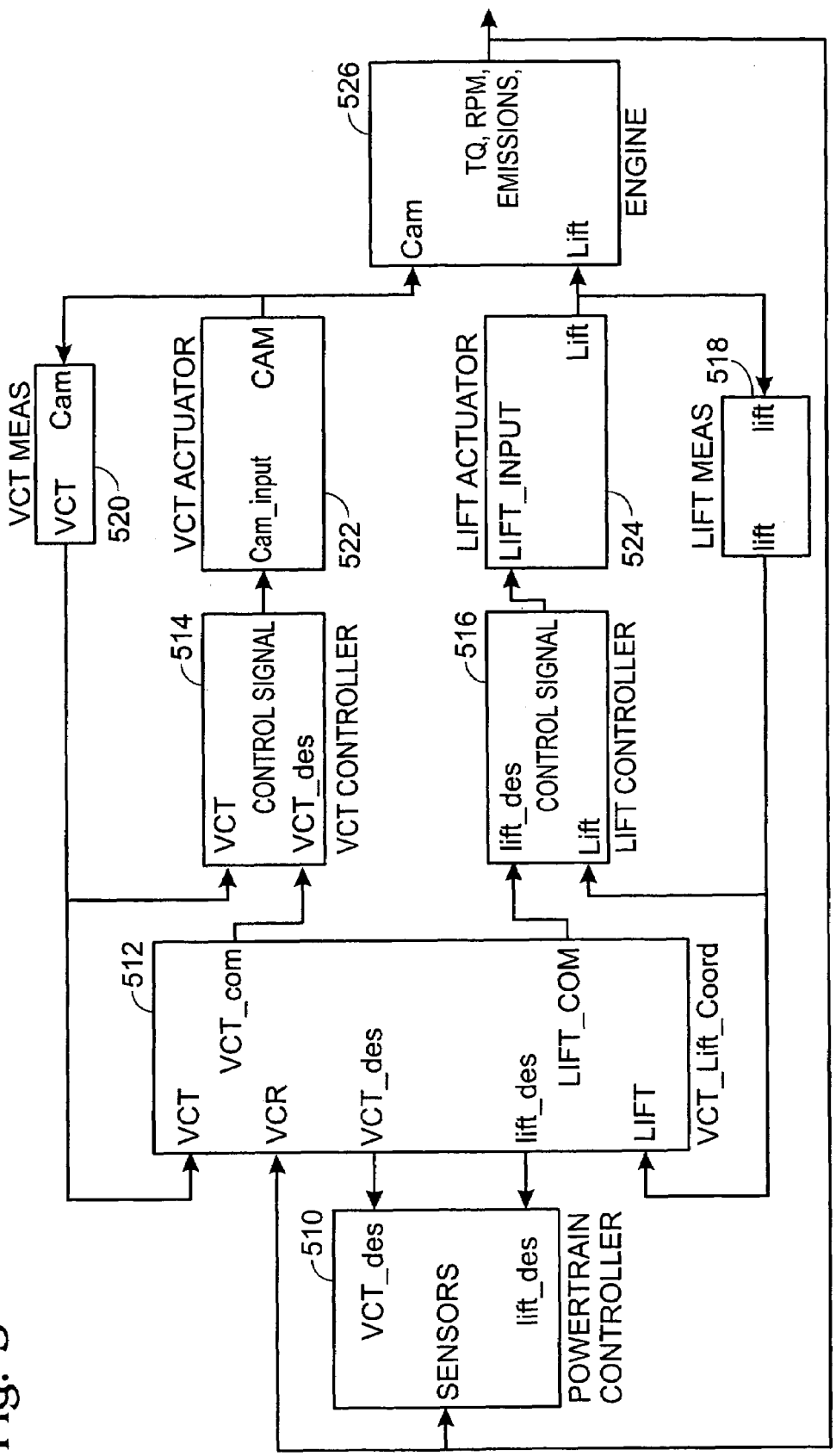

One method to maintain minimal clearance (MC) is to place an intermediate stage between the reference signals of desired lift and VCT and the close loop control stage that regulates each actuator's position. FIG. 5 indicates where this new sub-system-is added into an example CVVL/VCT system. The VCT and Lift Coordinator (labeled VCT_Lift_Coord, 512) is placed between the Powertrain Controller (510), that provides reference signals for VCT and lift, and actuator controllers (VCT_Controller and Lift_Controller, 514 and 516) that enforce the powertrain's reference signals. Specifically, the VCT and lift controllers (514 and 516) are feedback controllers that use measurements of valve lift and cam timing (518 and 520) to generate actuator signals sent to the VCT and lift actuators (522 and 524). Further, block 526 illustrates the engine model.

The Powertrain Controller's reference signals are based on achieving required fuel economy, emissions, and torque output. The scheduled steady state lift and VCT should result in actuator positions that leave adequate clearance between the valve and piston. In addition, the routines described below reduce the chance that the clearance is not maintained during actuator transitions. In other words, the actuator controllers are designed to respond to the Powertrain Controller's reference signals by providing prompt changes in actuator position and to maintain these desired positions by rejecting disturbances that can alter the actuator's position. The actuator controllers are supplemented by the Lift Coordination sub-system to coordinate movement between lift and VCT to maintain valve to piston clearance.

As will be appreciated by one of ordinary skill in the art, the specific routines described below in the text and flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 160.

Figure 6A:
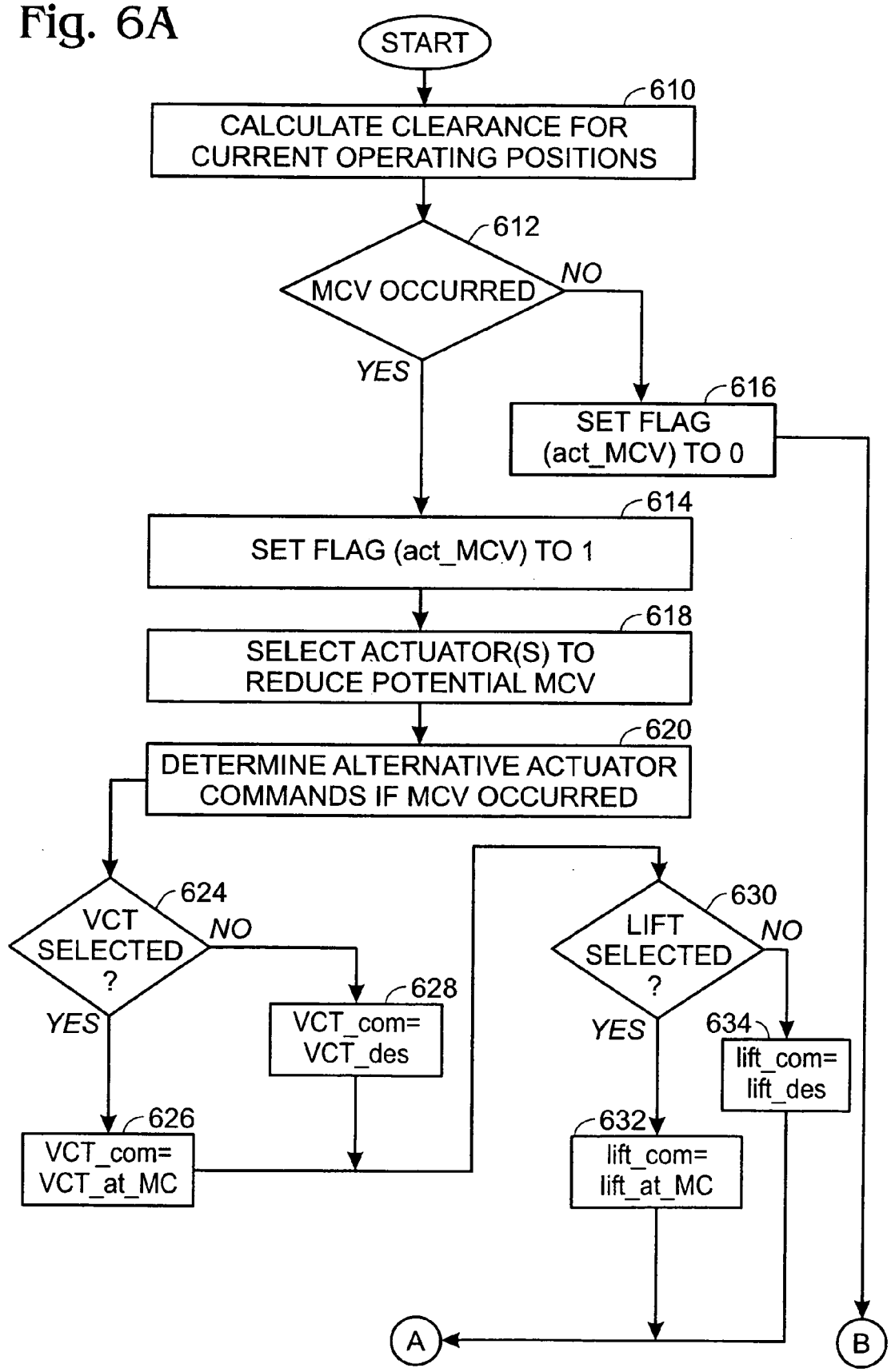
FIGS. 6A–6B are a high level flowchart of a routine.
Figure 6B:
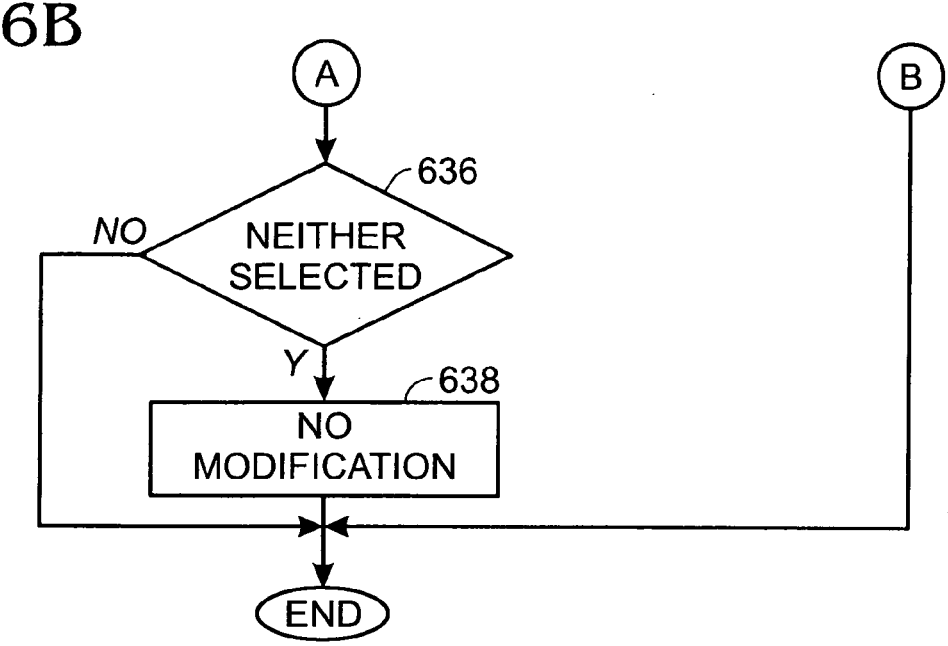
Figure 7:
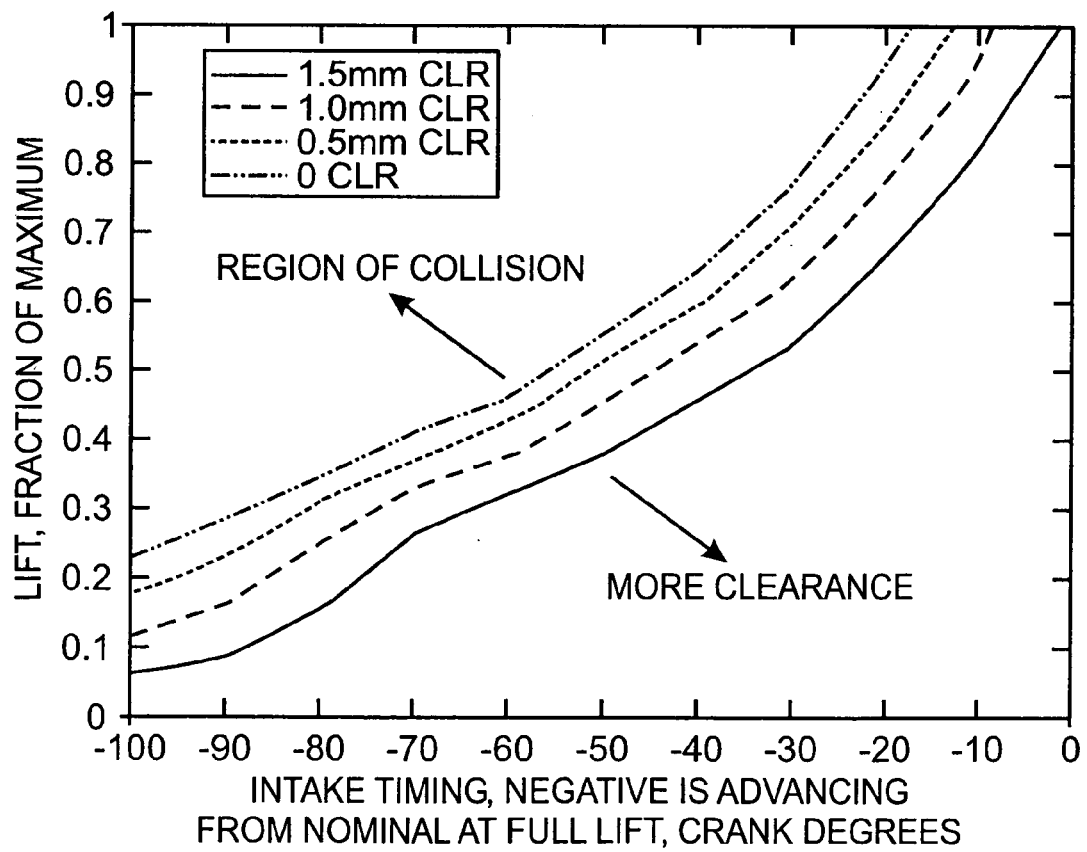

Referring now to FIGS. 6A–6B, a routine is described for coordinating valve lift and valve timing control. First, in step 610, the routine calculates the clearance for the current positions (operating conditions). In this example, the routine calculates a minimum clearance (MC). MC is created from a map that relates inputs of VCT and lift to an output of clearance. FIG. 7 shows data for a given engine/valve/cam combination. For the example of FIG. 7, the graph shows that for a given minimum clearance there is curve that relates lift and VCT at TDC. High lift and advanced VCT result in less clearance (i.e., increased potential for collision), whereas lower lift and retarded VCT result in more clearance. The exact path of the curves is dependent on engine geometry.

The calculation of clearance is done through a lookup function: clearance=Function_lift_vct_clr(lift, VCT, VCR)

where lift is either expressed as a fraction of maximum lift (used in this example) or a linear measurement of CVVL position, VCT is the cam timing relative to TDC of the piston position of an induction stroke, VCR is the current compression ratio at which the engine is operating, and clearance is the distance that exists between the piston at TDC and the intake valve. In this example, this function only contains values of clearance assuming the piston is at or near TDC. However, in an alternative example, it can contain additional information when operating slightly away from TDC.

Thus, for simplification purposes, the worst interference is assumed to be the TDC piston position. In actual operation, the VCT phase may result in a valve lift in which the greatest interference happens just before piston TDC. In other words, the absolute worst case would be TDC for the piston and "TDC" of the valve, but the limits of phasing might not allow that to occur, so the worst case may not be exactly TDC of the piston. The table data can be populated by locating the worst physically possible interference that can occur, which can be different than TDC piston. Thus, depending on engine design, engine geometry, and other factors, the worst case location of interference can vary.

Next, in step 612, the routine determines if a MCV has occurred. This step is accomplished by comparing the calculated clearance with a minimal clearance. If the clearance is less than or equal to the minimal clearance, the valve position is considered in violation of the specified clearance and a flag is set that will be used to halt one or both of the actuators. For some systems a necessary modification to this logic is to add a small tolerance to the minimal clearance in step 614. If the actuators' travel rate is sufficiently fast relative to the update rate of the algorithm, the actual clearance may be reduced beyond the minimum clearance because the actuator controllers' reference signals were not adjusted quickly enough once a violation has been detected. The logic in the VCT_Lift_Coord can allow for the additional tolerance, if required, as indicated below:

$$clearance\_total = clearance\_min + clearance\_tolerance$$

If clearance <=clearance_total then the flag (act_MCV, indicating that minimum clearance has been violated and that one or both actuators should not continue to move in a direction that further reduces clearance) is set to 1 in step 614. Otherwise, the flag (act_MCV) is set to zero in step 616. From step 616, the routine continues to the end.

Next, from step 614, the routine continues to step 618. In step 618, the routine selects an appropriate actuator(s) to respond to potential MCV. This step is accomplished by checking the desired direction (or, in an alternative embodiment, the actual direction) of movement of each actuator and setting a flag if the actuator is moving in a direction that has the potential to reduce clearance, such as increasing lift or advancing VCT. If the actuator movement direction reduces clearance, the act_MCV flag is passed on as a signal that is specific to an actuator (VCT_MCV or lift_MCV). For the VCT actuator, if VCT>VCT_des then the routine sets the flag VCT_MCV to act_MCV. Otherwise, the routine sets the flag VCT_MCV to zero. Here, VCT is the measured value of the VCT phasor and VCT_des is the Powertrain Controller VCT desired signal. This logic assumes that VCT position is negative for advance.

Similar logic is employed for the lift actuator. Specifically, if the lift<lift_des, then the flag lift_MCV is set to act_MCV. Otherwise, the flag lift_MCV is set to zero.

In an alternative embodiment, it is also possible to select multiple actuators to be adjusted. E.g., both the cam timing and valve lift are adjusted, or limited to a specific range or to be below a maximum value. Still further, the selection can take into account additional factors, or use alternative factors, such as the relative actuator responses. For example, if one actuator travels faster than the other in the particular operating conditions at issue, the faster actuator can be selected.

Next, in step 620, the routine determines alternative actuator commands to reduce potential interference if MCV has occurred as indicated in step 612. In particular, two table lookup functions, using the same body of data used in Function_lift_vct_clr, provide MC positions for a given actuator based on the desired clearance_total, the current position of the other actuator, and VCR, as indicated in the equations below:

VCT_at MC=Function_VCT_for_MC (clearance_total, lift, VCR)

lift_at—MC=Function_lift_for_MC (clearance_total, VCT, VCR).

Alternatively, the routine can determine a limited range of travel for each of the actuators that will reduce potential interference. Still further, the routine can set a maximum advance angle for cam timing, and a maximum lift for valve lift. Also, the routine can also limit not only positions, or ranges of the cam actuator and/or lift actuator, but also the rate of change of the actuators. Further still, in yet another alternative embodiment, the routine can limit both the cam timing and valve lift actuators.

Next, the routine replaces the chosen actuator's command with one that establishes MC:

The decision as to which actuator to modify is accomplished by using VCT_MCV or lift_MCV from step 618. If the actuator is not chosen, the Powertrain Controller's reference signal is passed on to the actuator position controller. If the actuator is chosen, the alternative command computed in step 620 is passed on to the actuator position controller instead. For the VCT actuator, from step 620 when MCV has occurred, the routine continues to step 624. In step 624, the routine determines if VCT_MCV=1 (i.e., is the VCT actuator selected). If so, then the control signal (VCT_com) is set to VCT_at_MC in step 626. Otherwise, in step 628, the command, VCT_com, is set to the desired cam timing from the engine operating parameters such as speed and load, VCT_des.

Then, in step 630, the routine determines if valve lift is selected. If so (lift_MCV=1), in step 632 the routine sets the lift command, lift_com, to the value determined in step 620, lift_at_MC. Otherwise, in step 634, the routine sets the lift command, lift_com, to the value desired value (lift_des).

Finally, in step 636, the routine determines if neither actuator is selected (i.e., neither actuator was moving in a direction to reduce valve lift). If so, the routine continues to step 638 where neither actuator is selected. This means either: (1) there is no danger of collision, or (2) there has been a clearance violation, but the normal scheduling has changed and now the actuators are moving away from the collision. In either scenario, interfering with the desired positions of the actuators would not likely alter the collision situation.

In one scenario it could be that the normal scheduling moves in the safe direction, but not enough. The actuator will get to that normal position, and if it is collision prone but not commanded to move more, then the actuator will no longer satisfy the direction requirement and it will be set to the calculated min clearance.

Figure 8:
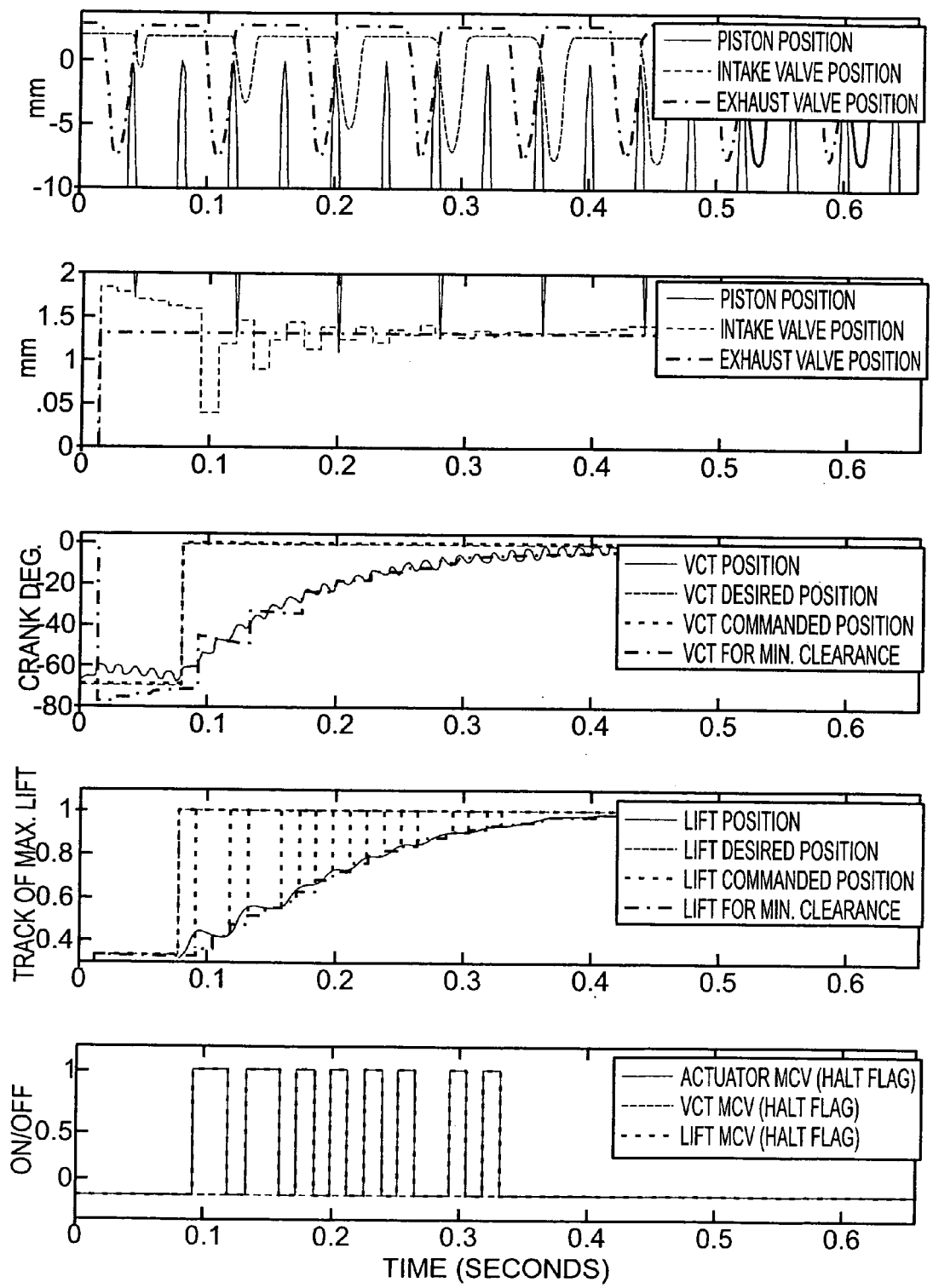
Figure 9:
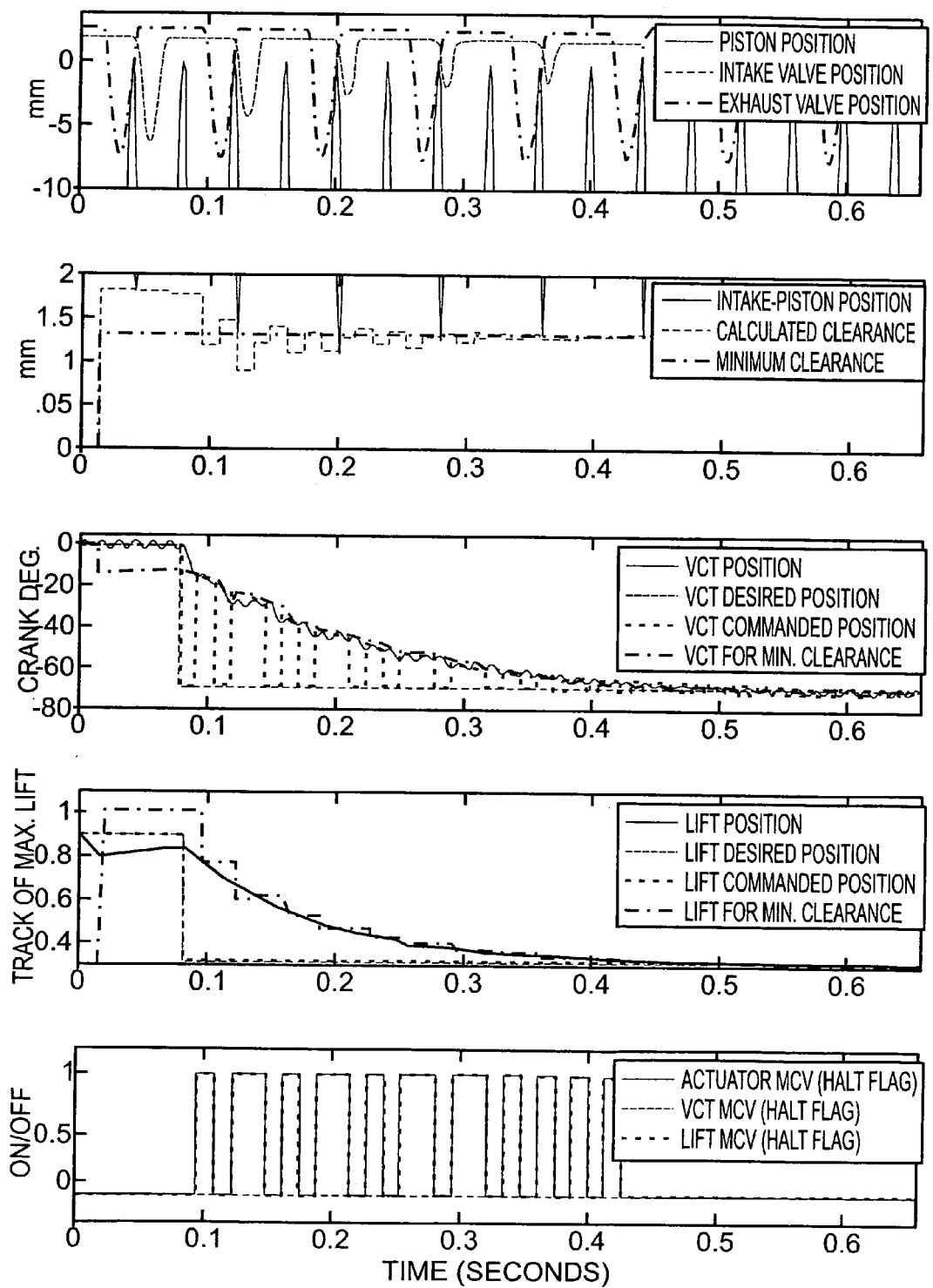

Typically, as seen in FIGS. 8 and 9, the scheduling attempts to go from one steady state place to another. As sown in FIG. 7, that would be from one safe corner to another. However, the mismatched speeds of the actuators cause the path to go through clearance violation zone in FIG. 7. So, when the actuators hit the minimum clearance curve, for example the 1.5 mm curve (where exactly this happens depends on the actuator speeds and commands), the actuators can be forced to track along the 1.5 mm curve until they break through to the new region of lift-VCT space where collision is unlikely. Here, they will occupy a position determined by best engine operation scheduling.

In this way, if the act_MCV flag is set and the routine attempts to mitigate MCV, it may override none, one, or both of the desired values depending on the direction the desired values would command the actuators to take. If both point outside of the violation zone, none will be modified. If they both point deeper into the zone both will be modified. The most common scenario is that one actuator is modified.

Note that the adjustment provided above to reduce potential interference may affect engine output, such as engine torque or engine speed. As such, if desired, adjustment can be made to compensate for any affect on engine output. For example, throttle position can be adjusted to provide more or less engine torque to compensate for cam timing or lift adjustments. Alternatively, or in addition, ignition timing changes/adjustments can also be used. Still further, if operating with a lean combustion air-fuel ratio, fuel adjustments can be used. Also, adjustments in cam timing or compression ratio can require corresponding adjustments in ignition timing to provide efficient operation. In other words, ignition timing may need to be adjusted during a limiting, or adjusting, of valve timing, valve lift, and/or compression ratio due to potential interference. In this way, overall efficient operation can be maintained, even when adjustments are made to reduce interference.

OPERATION IN CASES OF HARDWARE DEGRADATION

Various combinations of sensor or actuator degradation affect the control actions taken to reduce piston-valve interference, as indicated below.

The first case is where actuator(s) degrade with the sensors operating. In the case of a single actuator degradation, the routine relies on VCT_Lift_Coord to halt potentially interfering directional movement of the working actuator. Multiple failures may require more intrusive action.

A. In the case were the variable valve lift actuator degrades, the routine allows VCT_Lift_Coord to halt VCT advance that results in a potential clearance violation. The CVVL hardware design can also include a passive (spring) return system to position valve lift in a predetermined (e.g. low-lift) position.

B. In the case where the variable cam timing actuator degrades, the routine allows VCT_Lift_Coord to halt lift increase that results in clearance violation. The VCT hardware can also include a passive (spring) return mechanism to position intake VCT at predetermined (e.g. full-retard) position.

C. In the case where the variable compression ratio actuator degrades, the VCT_Lift_Coord routine uses the clearance table (Function_lift_vct_clr) based on the measured VCR position to reduce any potential interference.

D. In the case where both the variable valve lift actuator and the variable cam timing actuator degrade, the routine first determines if current conditions result in a violation. If so, the routine sets VCR to a low compression value. If there is still potential interference at the low compression position, the routine requests an engine shutdown.

E. In the case where the variable valve lift actuator and the variable cam timing or the variable compression ratio mechanism is degraded, the routine follows the approaches in paragraphs A or B using the appropriate VCR position in the clearance table.

F. In the case where the variable valve lift actuator, the variable cam timing, and the variable compression ratio mechanism are degraded, the routine determines if there is potential interference. If so, the routine requests engine shutdown operation.

The second case is where a sensor (or sensors) has degraded and actuator operation is uncertain.

A. In the case where a variable valve lift sensor degrades, the routine uses a back-up (redundant) lift sensor, if available. Alternatively, or in addition, if it is known that low compression cannot result in any interference for all valve lift and cam position combinations, the routine sets compression ratio to a low value and/or retards VCT assuming maximal valve lift.

B. In the case where cam timing sensor degrades, if it is known that low compression cannot result in any interference for all lift and timing combinations, the routine sets compression ratio to a low value, and/or reduces lift assuming fully advanced VCT as a substitute.

C. In the case where a variable compression ratio sensor degrades, the routine assumes VCR is in a high position and uses the corresponding clearance table to operates valve lift and VCT with the approach described in FIG. 6, above.

D. In the case where both CVVL and VCT sensors degrade, the routine adjusts compression ratio to a low compression, and send signals to the CVVL and VCT to reduce lift and retard timing.

E. In the case where both CVVL and VCR sensors degrade, the routine retards VCT.

F. In the case where both VCT and VCR sensors degrade, the routine reduces lift.

G. In the case where each of the CVVL, VCT, and VCR sensors degrade, the routine shut down the engine.

Data was generated using a model that uses crank angle to produce positions of the engine piston, intake, and exhaust valves relative to the center of the gasket that separates the cylinder head and the engine block. The data was generated with a relatively high compression of the engine, providing a large range of potential valve to piston interference. The VCT and CVVL actuators and the feedback controls that regulate these mechanisms was represented by first order filter structures in which the integrator in the structure, the value of which is the actuator position, can be initialized at the beginning of the simulation. The actuator speeds, set by gain before the integrator, are relatively high, so that the simulation can produce a large range of actuator movement in only a few engine cycles. In one case, the gain of the CVVL actuator is set to 20, and the gain VCT is set to 10 to demonstrate the coordination when the lift outruns VCT (FIG. 8 plots results). In another case, the gain of the CVVL actuator was set to 10, and the gain VCT was set to 20 to demonstrate the coordination when the VCT outruns lift (FIG. 9 plots results).

Specifically, FIG. 8 shows results with the lift actuator set to a high rate, and the VCT actuator set to low a rate. The lift schedule goes from 0.3 to 1.0 of maximum lift, and VCT retards from 70 degrees advanced (indicated as −70) to 0 degrees advanced. The figure shows how lift increases too fast for VCT retard, so the VCT Lift Coordinator interrupts the desired signal to the CVVL mechanism when the minimum clearance is violated (second row, dashed trace falls below dotted trace). The fourth row plot shows the lift commanded value (dotted) is jumping to the calculated MC lift position (dash-dot) when the lift_MCV flag is 1 (fifth row plot, dotted trace). The fourth row plot, solid trace, shows the lift position, which progresses normally when at MC, and reduces towards MC when in violation.

FIG. 9 shows results with the lift actuator set to a low rate, and the VCT actuator set to a high rate. The lift schedule goes from 0.9 to 0.3 of maximum lift, and VCT advances from 0 degrees advanced to −70 degrees advanced. Here, the VCT advances too fast for lift reduction, so the VCT Lift Coordinator interrupts the desired signal to the VCT mechanism when the minimum clearance is violated (second row, dashed trace falls below dotted trace). The third row plot shows the VCT commanded value (dotted) jumping to the calculated MC VCT (dash-dot) when the VCT halt flag is 1 (fifth row plot, dashed trace). The third row plot, solid trace, shows the VCT, which progresses normally when at MC, and moves towards MC when in violation. The VCT has combustion frequency oscillation of +/−2 degrees about the average VCT position.

As such, in either case, it is possible to select an actuator to reduce potential interference in a way that accounts for the varying response speeds of the differing actuators.

This concludes the description of the invention. The reading of it by those skilled in the art would bring to mind many alterations and modifications without departing from the spirit and the scope of the invention. Accordingly, it is intended that the scope of the invention be defined by the following claims:

We claim:

1. A method for controlling valve operation of valves coupled to a cylinder of an internal combustion engine with a piston, the method comprising:
   varying compression ratio, valve timing, and valve lift, of the engine;
   indicating potential interference between the piston and the valve;
   during a first set of directions of valve timing change valve lift change, and compression ratio, adjusting valve timing to reduce said potential for interference; and
   during a second set of directions of valve timing change and valve lift change, and compression ratio, adjusting valve lift to reduce said potential for interference.

2. The method recited in claim 1 wherein said indication of potential interference is an indication of operation at conditions where clearance between a piston and an intake valve is below a threshold value when the piston is at a top dead center position.

3. The method recited in claim 1 wherein said indication of potential interference is based on current operating conditions.

4. The method recited in claim 3 wherein said current operating conditions include cam timing.

5. The method recited in claim 3 wherein said current operating conditions include valve lift.

6. The method recited in claim 3 wherein said current operating conditions include compression ratio.

7. The method recited in claim 6 wherein said compression ratio is a current compression ratio value of a variable compression ratio system.

8. The method recited in claim 1 wherein said first and second set of directions are selected based on whether at least one of valve timing and valve lift are changing in a direction that reduces potential clearance.

9. The method recited in claim 1 wherein said adjusting of valve timing or valve lift includes limiting position of travel to a selected range.

10. The method recited in claim 1 wherein said adjusting of valve timing or valve lift includes limiting position of travel to a maximum value.

11. A method for controlling valve operation of valves coupled to a cylinder of an internal combustion engine with a piston, the method comprising:
   indicating potential interference between the piston and the valve based on engine valve timing, valve lift, and compression ratio;
   during a first set of directions of valve timing change and valve lift change, adjusting valve timing to reduce said potential for interference;
   during a second set of directions of valve timing change and valve lift change adjusting valve lift to reduce said potential for interference; and
   adjusting engine torque to compensate for a torque effect of said adjusting.

12. The method recited in claim 11 wherein said indication of potential interference is an indication of operation at conditions where clearance between a piston and an intake valve is below a threshold value when the piston is at a top dead center position.

13. The method recited in claim 11 wherein said first set of directions include when valve timing is changing in a direction that reduces potential interference, and said second set of directions include when valve lift is changing in a direction that reduces potential interference.

14. The method recited in claim 11 wherein said adjusting said valve timing or valve lift includes limiting position of travel to a selected range.

15. The method recited in claim 11 wherein said adjusting said valve timing and valve lift includes limiting position of travel to a maximum value.

16. The method recited in claim 11 further comprising adjusting compression ratio based on engine or vehicle operating conditions.

17. A computer storage medium having instructions encoded therein for controlling valve operation of valves coupled to a cylinder of an internal combustion engine with a piston, the engine in a powertrain in a vehicle on the road, said medium comprising:
   code for identifying potential interference between the piston and the valve based on engine valve timing valve lift, and compression ratio;
   code for, during a first set of directions of valve timing change and valve lift change, adjusting valve timing to reduce said potential for interference;
   code for, during a second set of directions of valve timing change and valve lift change, adjusting valve lift to reduce said potential for interference; and
   code for adjusting engine torque to compensate for a torque effect of said adjusting.

18. The system of claim 17 wherein said code for adjusting one of valve timing and valve lift comprises code for limiting a position of said valve timing or valve lift.

19. The system of claim 18 wherein said code for adjusting one of valve timing and valve lift further comprises code for limiting a position and a rate of change of one of valve timing and valve lift.

20. The system of claim 17 wherein said code for adjusting one of valve timing and valve lift further comprises adjusting both said valve timing and valve lift.

21. The system of claim 17 wherein said code for adjusting is carried out during engine operation.

22. The system of claim 17 further comprising code for, during a second set of directions of valve timing change and valve lift change, adjusting compression ratio to reduce said potential for interference.

* * * * *